United States Patent
Hippeläinen et al.

(10) Patent No.: US 11,294,084 B2
(45) Date of Patent: Apr. 5, 2022

(54) SEISMIC DETERMINATION OF LOCATION

(71) Applicant: Nokia Technologies Oy, Espoo (FI)

(72) Inventors: Leo Hippeläinen, Helsinki (FI); Ian Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 425 days.

(21) Appl. No.: 16/304,295

(22) PCT Filed: Jun. 1, 2016

(86) PCT No.: PCT/FI2016/050391
§ 371 (c)(1),
(2) Date: Nov. 25, 2018

(87) PCT Pub. No.: WO2017/207865
PCT Pub. Date: Dec. 7, 2017

(65) Prior Publication Data
US 2019/0137642 A1  May 9, 2019

(51) Int. Cl.
| | |
|---|---|
| *G01V 1/30* | (2006.01) |
| *G01V 1/104* | (2006.01) |
| *G01V 1/00* | (2006.01) |
| *G01V 1/28* | (2006.01) |
| *G06F 21/72* | (2013.01) |

(Continued)

(52) U.S. Cl.
CPC .............. *G01V 1/30* (2013.01); *G01V 1/008* (2013.01); *G01V 1/104* (2013.01); *G01V 1/288* (2013.01); *G06F 11/30* (2013.01); *G06F 21/53* (2013.01); *G06F 21/55* (2013.01); *G06F 21/57* (2013.01); *G06F 21/72* (2013.01)

(58) Field of Classification Search
CPC ............ G01V 1/30; G01V 1/008; G01V 1/288
See application file for complete search history.

(56) References Cited

U.S. PATENT DOCUMENTS

| | | |
|---|---|---|
| 5,227,929 A | 7/1993 | Comerford |
| 5,623,455 A | 4/1997 | Norris |

(Continued)

FOREIGN PATENT DOCUMENTS

| | | | | |
|---|---|---|---|---|
| WO | WO-2009065036 A1 * | 5/2009 | ............ | G06T 5/008 |
| WO | 2016/076729 A1 | 5/2016 | | |

OTHER PUBLICATIONS

"Cloud Computing", Wikipedia, Retrieved on Nov. 14, 2018, Webpage available at: https://en.wikipedia.org/wiki/Cloud_computing.

(Continued)

*Primary Examiner* — Elias Desta
(74) *Attorney, Agent, or Firm* — Laine IP Oy (57) ABSTRACT

According to an example aspect of the present invention, there is provided an apparatus comprising a memory configured to store seismic data, at least one processing core configured to perform a geographic determination, based on the seismic data and reference data, the geographic determination relating to a geographical location of a device that produced the seismic data. In some embodiments, the device that produced the seismic data is comprised in a cloud computing server. In other embodiments, the device that produced the seismic data is integrated in a secure computing element on a motherboard of a computer. In further embodiments, the reference data originates in a trusted seismographic source.

18 Claims, 6 Drawing Sheets

(51) Int. Cl.
  *G06F 11/30* (2006.01)
  *G06F 21/55* (2013.01)
  *G06F 21/53* (2013.01)
  *G06F 21/57* (2013.01)

(56) References Cited

U.S. PATENT DOCUMENTS

| | | |
|---|---|---|
| 7,822,549 B2 | 10/2010 | Itzhak |
| 8,560,453 B2 | 10/2013 | Pendakur et al. |
| 8,832,461 B2 | 9/2014 | Saroiu et al. |
| 9,256,742 B2 | 2/2016 | Raghuram et al. |
| 9,258,331 B2 | 2/2016 | Dyer et al. |
| 9,500,758 B2 * | 11/2016 | Duret .................. G01V 1/36 |
| 2006/0212755 A1 | 9/2006 | Urmanov et al. |
| 2008/0144438 A1 | 6/2008 | Ferber |
| 2009/0303205 A1 | 12/2009 | Seibert et al. |
| 2010/0169021 A1 | 7/2010 | Moisio |
| 2010/0268481 A1 | 10/2010 | Lee |
| 2012/0069704 A1 | 3/2012 | Cambois |
| 2013/0041616 A1 | 2/2013 | Cantillo et al. |
| 2013/0138994 A1 | 5/2013 | Notohardjono et al. |
| 2013/0238786 A1 | 9/2013 | Khesin |
| 2013/0347058 A1 | 12/2013 | Smith et al. |
| 2014/0293741 A1 | 10/2014 | Halliday et al. |
| 2015/0260862 A1 | 9/2015 | Araki et al. |
| 2016/0055340 A1 | 2/2016 | Sand-Soil |
| 2016/0065589 A1 | 3/2016 | Leighton et al. |

OTHER PUBLICATIONS

"Trusted Platform Module (TPM)", Trusted Computing Group, Retrieved on Nov. 14, 2018, Webpage available at: http://trustedcomputinggroup.org/.

"Seismic Wave", Wikipedia, Retrieved on Nov. 14, 2018, Webpage available at: https://en.wikipedia.org/wiki/Seismic_wave.

"Locating and Measuring Earthquakes", Scecinfo, Retrieved on Nov. 14, 2018, Webpage available at: http://scecinfo.usc.edu/eqcountry/roots/measuring.html.

"How Do I Locate That Earthquake's Epicenter?", UPSeis, Retrieved on Nov. 14, 2018, Webpage available at http://www.geo.mtu.edu/UPSeis/locating.html.

"Help Detect Earthquakes With Your Phone", Arstechnica, Retrieved on Nov. 14, 2018, Webpage available at https://arstechnica.com/science/2016/02/help-detect-earthquakes-with-your-phone/.

"Z13 Earthquake Shake Test", Youtube, Retrieved on Nov. 14, 2018, Webpage available at: https://www.youtube.com/watch?v=kmMn5Q_Inkk.

"Seismic Waves", BBC, Retrieved on Nov. 14, 2018, Webpage available at: http://www.bbc.co.uk/schools/gcsebitesize/science/edexcel/waves_earth/seismicwavesrev3.shtml.

International Search Report and Written Opinion received for corresponding Patent Cooperation Treaty Application No. PCT/FI2016/050391, dated Oct. 20, 2016, 20 pages.

Extended European Search Report received for corresponding European Patent Application No. 16903896.5, dated Jan. 24, 2020, 9 pages.

* cited by examiner

SEISMIC DETERMINATION OF LOCATION

RELATED APPLICATION

This application was originally filed as PCT Application No. PCT/FI2016/050391 filed Jun. 1, 2016.

FIELD

The present invention relates to determining a location of a computing device, for example using seismic or other information.

BACKGROUND

Information processing may be obtained in different ways. Individuals or businesses may choose, for example, to establish their own data processing centres, or they may rent capacity in data processing centres run by others. In the latter case, information processing may be obtained as a service from an outside party, such as a commercial data centre, or, for example, a university or government-run supercomputer or computing grid.

Establishing a data processing centre may entail significant technical obstacles, depending on the data processing requirements. For example, where intensive or massive processing is needed, excavating an underground cave may be necessary to house computing hardware. In case the information processing need is not permanent, resources expended in establishing the data processing centre may be ultimately wasted, wherefore using a third-party data processing service may be seen as attractive.

Cloud computing is a term employed to refer to network based computing that employs shared processing resources on demand. It is a model for enabling on-demand access to a pool of information processing resources, such as data processing centres, which can be flexibly provisioned and released.

While cloud computing may be, depending on the situation, an attractive option, it presents with challenges that relate to its nature. For example, an end user may have limited visibility regarding where his information is being processed, since processing tasks may, in principle, be migrated between data processing centres between different countries or even continents, for example when performing load balancing between data processing centres.

Seismic data characterizes vibrations of the Earth's crust. Such vibrations may comprise elastic waves propagating through parts of the Earth, earthquakes and/or tremors caused by impacts or explosions.

SUMMARY OF THE INVENTION

The invention is defined by the features of the independent claims. Some specific embodiments are defined in the dependent claims.

According to a first aspect of the present invention, there is provided an apparatus comprising a memory configured to store seismic data, at least one processing core configured to perform a geographic determination, based on the seismic data and reference data, the geographic determination relating to a geographical location of a device that produced the seismic data.

Various embodiments of the first aspect may comprise at least one feature from the following bulleted list:

- the apparatus comprises the device that produced the seismic data
- the device that produced the seismic data is comprised in a cloud computing server
- the reference data originates in a second device, the second device being indicated as being co-located with the device that produced the seismic data
- the geographic determination comprises determining whether the seismic data corresponds to the reference data
- the reference data originates in a trusted seismographic source
- the geographic determination comprises determining, using seismic wave shape characteristics and/or propagation delays, whether the seismic data is consistent, together with the reference data, with a presumed location of the device that produced the seismic data
- the geographic determination comprises deriving, using seismic wave shape characteristics and/or propagation delays and the reference data, an estimate of a geolocation of the device that produced the seismic data
- the reference data comprises seismic characteristics of at least one artificial seismic event
- the device that produced the seismic data is integrated in a motherboard of a computer
- the device that produced the seismic data is integrated in a secure computing element on a motherboard of a computer
- the device that produced the seismic data is integrated in one of: a daughter-board card, a peripheral card and a PCI card of the apparatus
- the at least one processing core is configured to process the seismic data to remove electric motor induced noise from the seismic data before performing the geographic determination.

According to a second aspect of the present invention, there is provided a computing device comprising memory, a processor and a secure computing element, the secure computing element comprising a seismic sensor, the computing device being configured to obtain seismic data from the seismic sensor.

According to a third aspect of the present invention, there is provided a method comprising storing seismic data, and performing a geographic determination, based on the seismic data and reference data, the geographic determination relating to a geographical location of a device that produced the seismic data.

Various embodiments of the third aspect may comprise at least one feature corresponding to a feature from the preceding bulleted list laid out in connection with the first aspect.

According to a fourth aspect of the present invention, there is provided an apparatus comprising means for storing seismic data, and means for performing a geographic determination, based on the seismic data and reference data, the geographic determination relating to a geographical location of a device that produced the seismic data.

According to a fifth aspect of the present invention, there is provided a non-transitory computer readable medium having stored thereon a set of computer readable instructions that, when executed by at least one processor, cause an apparatus to at least store seismic data, and perform a geographic determination, based on the seismic data and reference data, the geographic determination relating to a geographical location of a device that produced the seismic data.

According to a sixth aspect of the present invention, there is provided a computer program configured to cause a method in accordance with the third aspect to be performed.

EMBODIMENTS

Seismic data may be obtained in connection with performing information processing tasks. The seismic data may be obtained from a seismic sensor in a computing device used to perform the information processing tasks, and the seismic data may be used to determine or verify a location, where the information is being processed. As seismic waves traverse the Earth, seismic data characterizing them in one location may be compared to reference seismic data to determine or verify the location.

Figure 1:
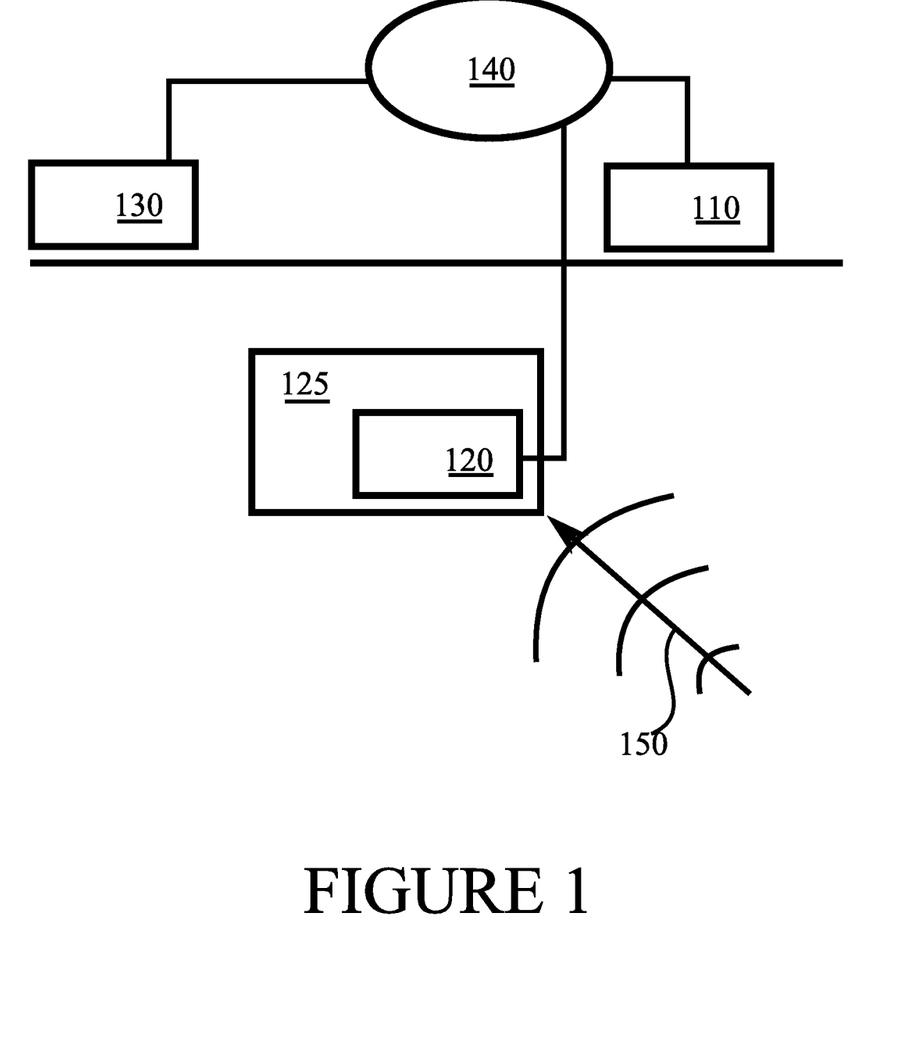
FIG. 1 illustrates an example system in accordance with at least some embodiments of the present invention.

FIG. 1 illustrates an example system in accordance with at least some embodiments of the present invention. Device 110 may comprise a laptop or desktop computer or other kind of suitable computing device, such as, for example, a smartphone or tablet device. Device 110 may be used to control computing tasks performed off-site, such as, for example, in a remote computing data centre 125, which in this example is located in an underground space. In other embodiments, data centres may be located in buildings above ground. Data centre 125 may comprise a cloud computing data centre, for example.

Device 110 may be used to cause computing device 120, located in data centre 125, to perform information processing tasks on behalf of the user of device 110. For example, computing device 120 may comprise a supercomputer, server or server farm, and the information processing tasks may relate to gene sequencing, protein crystallography, data mining or monte carlo simulations, for example. Computing device 120 may be provided with data and configuration information needed to perform the information processing, after which computing device 120 may then perform the information processing task or tasks, and provide results thereof to device 110 or another entity, as instructed. Connections between device 110 and computing device 120 may be end-to-end secured protocol connections, such as hypertext transfer protocol, HTTP, over transport layer security, TLS, the combination also being known as HTTPS. Another example protocol is secure shell, SSH.

Information being processed by computing device 120 on behalf of device 110 may be sensitive in nature. For example, the information may relate to personal information, medical information, industrial designs or radar processing used for control of national airspace. Users of device 110 may thus require that the information processing is performed in a secure manner, which may comprise that the data being processed is not moved between data centres, for example for load balancing reasons. Each time data is moved between two data centres, such as data centre 125, eavesdroppers may have an opportunity to intercept the information in transit. This may occur by the data centres themselves being covertly monitored, or by covert surveillance of data transmission resources between the data centres. Furthermore, in some jurisdictions, sensitive information is legally required to reside inside territory of the jurisdiction. Preventing transfer of the information, or processing contexts that comprise, at least partly, the information, thus increases computation security.

Users of device 110 may thus require that their information is processed on their behalf at a certain site, or inside certain geographic boundaries, such as national borders, for example. Users of device 110 may seek to verify their requirement is complied with, in other words, to check their data is in fact processed where it should be, and not elsewhere.

One option for such verification is use of satellite positioning, such as global positioning system, GPS, GLONASS or Galileo satellite constellations. However, challenges associated with this option include the fact that satellite positioning signals penetrate underground, or even indoor, sites only to a limited extent. Furthermore, tampering with a satellite positioning chip comprised in a server is not technically unfeasible. Tampering with satellite positioning by providing forged satellite signals may also be possible. Similar considerations apply to positioning techniques using cellular communication networks.

Use of network topology is another method to verify a location where processing takes place, however data packet headers are not immune to tampering and network topology overall is not always entirely unambiguous as to geographical location of nodes comprised in the network. A visit to a data centre by an auditor is a further possibility, however visiting in person is slow and cannot be performed on a continuous basis. Furthermore, a human auditor may have limited means to fundamentally verify that all processing takes place in the servers he can see at the site.

A further option is to furnish computing devices used in the information processing with seismic sensors. By a seismic sensor it is herein meant a device that is enabled to generate seismic data, the seismic data characterizing seismic waves or events. Such a device may be considered to be a sensor device. A seismic sensor may be seen as a certain type of acceleration sensor, for example. The seismic sensor may be comprised in a motherboard of computing device 120, for example. In particular the seismic sensor may be comprised in a secure computing element that is comprised in computing device 120. Examples of embodiments of secure computing elements include firstly, a trusted platform module, TPM, as specified by the Trusted Computing Group, and secondly a universal integrated circuit card, UICC. Tampering with processes that take place in a secure computing element may be significantly more difficult than tampering with processes that take place elsewhere on a motherboard of a computing device. TPM may be used to secure a computing context on a hardware level, so the computing context becomes trusted. Using TPM, actual data processing may take place in a normal CPU core, but use of TPM together with a CPU model that supports execution modes required by TPM guarantees that only trusted software can be run in the system, that is, malware can be excluded from execution.

In addition to providing control information to control the information processing performed on behalf of users of device 110 in a data centre, the users may place calls to the secure computing element to retrieve seismic data therefrom, for example over an end-to-end secured protocol connection from the secure computing element to device 110, or in general a device operated by the end users. Alternatively, a secured protocol connection may be established between a data processor of computing device 120 and the secure computing element, and the seismic data may be provided to the users along with the rest of their data, over an end-to-end connection from computing device 120 to the users' device. In embodiments where the seismic sensor is comprised in computing device 120 but not in a secure computing element, the seismic data may be retrieved via the data processor of computing device 120, for example via a secure end-to-end connection. In some embodiments, the seismic data is cryptographically signed by the computing device, at either the data processor or at the secure computing element, where such is present. The seismic sensor and/or secure computing device may be connected with the data processor via a local bus, such as, for example, LPC, SPI, $I^2C$ or an equivalent solution.

The users may compare seismic data received from computing device 120 in the data centre with reference seismic data, obtained from trusted sources such as national seismographic institutes, for example. Such a reference data source is illustrated in FIG. 1 as data source 130. Device 110, computing device 120 and reference data source 130 are arranged to communicate via suitable networking technologies, illustrated schematically in FIG. 1 as network 140. One embodiment of network 140 is the Internet, but other networks, and indeed plural networks, are of course suitable.

In the example of FIG. 1, seismic wave 150 traverses the Earth's crust and is detected by the seismic sensor in computing device 120. Reference data source 130 will also detect seismic wave 150, which may in fact be detected by several reference data sources. Seismic waves, such as seismic wave 150, may comprise S-waves or P-waves, for example. To enable detection of seismic waves, the seismic sensor in computing device 120 may be configured to use a sampling rate consistent with detecting seismic waves.

Users may compare seismic data retrieved from computing device 120 with reference data, to perform a geographic determination. Such a geographic determination may be performed using suitably arranged software, and it may be performed automatically, for example periodically or at random or pseudorandom intervals. For example, the geographic determination may comprise determining, whether the seismic data is compatible with the reference data and a claimed location of the computing device. In the situation of FIG. 1, the users might determine that the seismic data from computing device 120 characterizes seismic wave 150 with an earlier timestamp than the reference data, since seismic wave 150 happens to be detectable at data centre 125 earlier than at reference data source 130 owing to its propagation direction. If on the other hand the reference data characterizes seismic wave 150 but seismic data from computing device 120 does not, the users may suspect their information is in fact not processed at data centre 125 at all. The same may be the case where seismic data from computing device 120 characterizes seismic events that are not present in the reference data. Seismic wave 150 may have shape characteristics that are reflected in the seismic data. Examples of shape characteristic may include at least one of: duration of the wave event, frequency information and amplitude as function of time.

In general computing device 120 may comprise a computing device comprising memory, a processor and a secure computing element, the secure computing element comprising a seismic sensor, the computing device being configured to obtain seismic data from the seismic sensor.

Figure 2A:
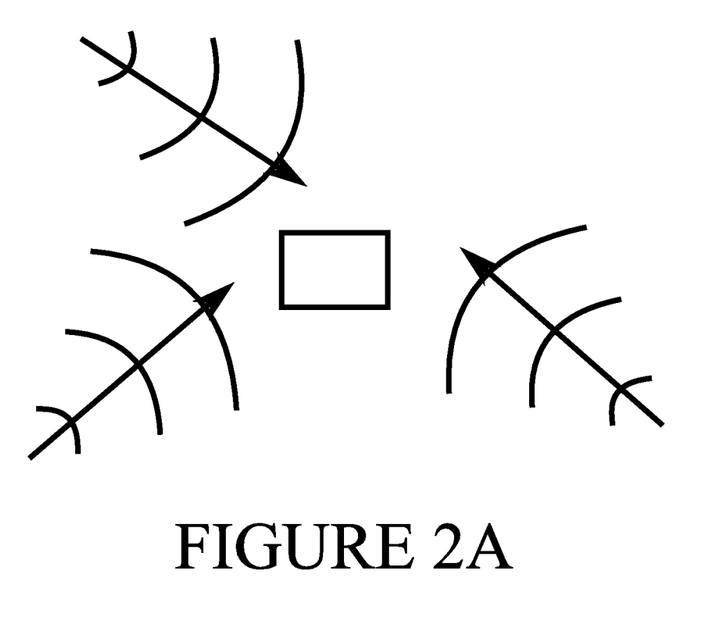
FIGS. 2A and 2B illustrate examples of seismic data based location verification.
Figure 2B:
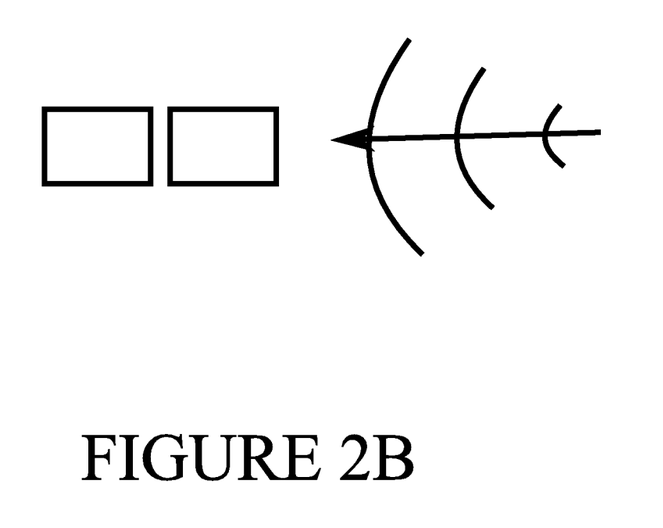

FIGS. 2A and 2B illustrate examples of seismic data based location verification. In FIG. 2A, a seismic sensor detects three seismic waves. Reference data, from known locations, may be used to verify that the seismic data from the seismic sensor is consistent with the claimed location of the data centre. In detail, individual seismic waves and, optionally, their propagation directions may be estimated based on the reference data, and characteristics of these seismic waves may be sought in the seismic data from the seismic sensor. Distances from reference data sources may be used to estimate a point in time, when individual seismic waves should be present in the seismic data from the seismic sensor. Seismic wave shape and frequency characteristics may be usable in matching, and may facilitate finding individual waves, corresponding to waves in the reference data, in the data from the seismic sensor. A propagation direction may be unnecessary to know, at least in some embodiments. Normal propagation speeds may be assumed for the seismic waves, and seismic wave events may be matched between the seismic data and the reference data. For example, a seismic event seen in the reference data may be sought in the seismic data from computing device 120, at most a time interval after or before the seismic event is reflected in the reference data. The time interval may be selected in dependence of a distance between the reference data source and a location where computing device 120 should be.

In some variants of FIG. 2A, it may be possible to estimate a geo-location of the seismic sensor even without a prior estimate of where the data centre is claimed to be located. This may require a broader available set of reference data. This may be possible, since seismic data not only characterizes a time of arrival of a seismic wave, but seismic waves may have shape and frequency characteristics that may be matched with seismic waves present in reference data. In the absence of directional data concerning the seismic waves, their attenuation as they traverse the Earth may be used as an approximate measure of distance.

FIG. 2B illustrates another embodiment, where a reference data source is co-located with computing device 120, in data centre 125. This arrangement has the benefit that analysis of the seismic sensor data is simpler, since the seismic data from computing device 120 is expected to closely match the reference data, as they are produced at the same site. In other words, in performing the geographic determination, the reference data source is indicated as being co-located with computing device 120. In this case, the reference data source may be tamper-resistant and acoustically coupled with the ground at data centre site 125. Connections between the end users' devices and the reference data source, and the seismic sensor in computing device 120, may here, too, comprise secured end-to-end connections, at least in part. In this case the reference data may have a same sampling rate as the seismic data from the seismic sensor, and a pattern matching algorithm may be used to correlate the two signals.

In general, seismic signals usable with embodiments of the present invention need not be natural signals. To the contrary, heavy traffic and explosions create signals that may be used as well as, or instead of, natural signals. In some embodiments, an auditor may even cause an artificial seismic signal to verify a location of information processing, for example by detonating a small explosive charge in a suitable borehole above, or nearby, a data centre. In this case, the reference data would include a timing and/or shape of the artificial seismic signal. Artificial seismic signals may be useful, for example, in locations with little natural seismic activity.

In general, processing of reference and sensor data need not be real-time. Reference data, and seismic sensor data from the computing device, may be furnished with timestamps, enabling after-the-fact analysis as to whether the two datasets are consistent with a presumed location of the data centre. Some seismic wave data analysis functions are computationally intensive, which works to the benefit of the users, as counterfeiting seismic data in real-time is correspondingly more difficult. Trusted computing based encrypting and/or cryptographic signing may be used to guarantee integrity of the seismic data.

To facilitate processing of seismic data, periodic noise caused by computing devices themselves may be filtered away from the data before use. Electric fans, hard drives and other components may cause vibrations of a predictable type, the contributions of which may be removed from the data by processing either at the data centre, or at the clients' devices. A further facilitating technique may comprise that at least one computing device is arranged in the data centre in a way that it is not decoupled from seismic vibration. This device may be hardened against earthquakes, for example in case it would otherwise be vulnerable to them.

Seismic sensors may also detect physical movement of computing devices, wherefore a move of the data centre and its contents would become detectable to the users. Such signals would differ markedly in characteristics from seismic waves.

Seismic sensors may be manufactured by trusted parties. The seismic sensors may, in some embodiments, be furnished with microphones, to enable the users to test whether they are located in the same computer as the data processors, for example by briefly triggering a buzzer of the computing device, and investigating whether the sound of the buzzer is detectable in data sent by the seismic sensor.

In some embodiments, seismic sensors are connected with backup battery power, to enable logging of vibrational data even in case the computing devices are disconnected from mains power, for example for transport. The logged data may be provided to the users once the computing device is once more connected to mains. Vibrations recorded during transit are easily distinguishable from seismic data obtained from seismic sensors that have not been shipped to another location.

Figure 3:
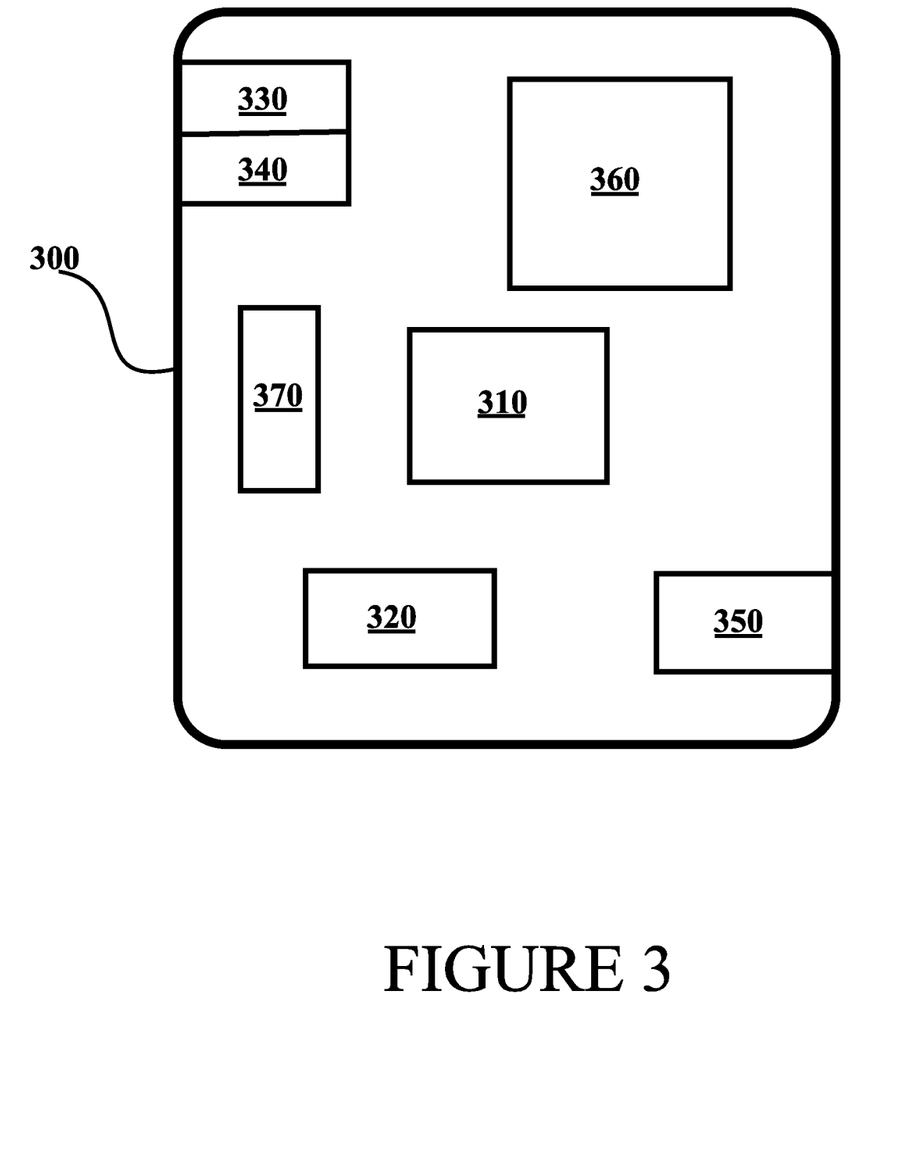
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as computing device 120 of FIG. 1, or, in applicable parts, device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon, AMD Opteron and/or Intel Xeon processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure remote information processing or manage seismic verification of a location of remote information processing.

Device 300 may comprise seismic sensor 370. Seismic sensor 370 may be comprised in a secure computing element, for example.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or seismic sensor 370.

Processor 310, memory 320, transmitter 330, receiver 340, NFC transceiver 350, UI 360 and/or seismic sensor 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
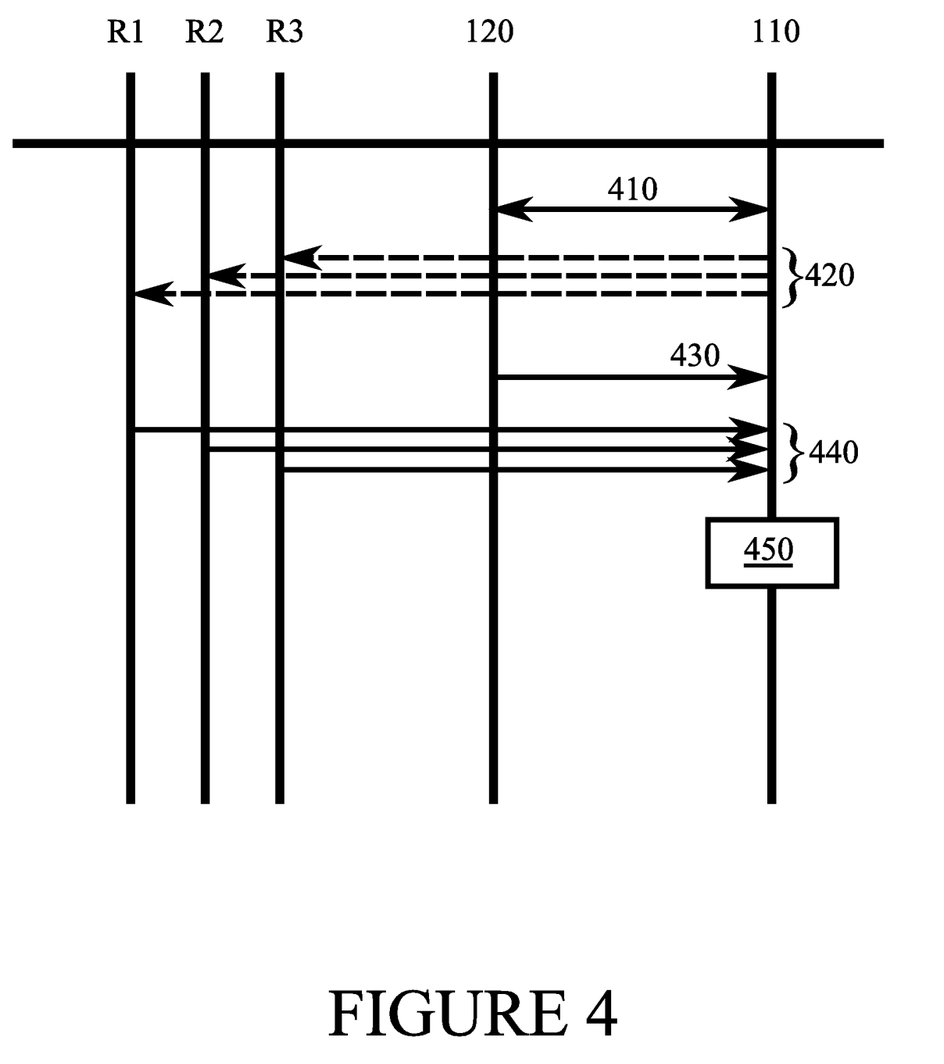
FIG. 4 illustrates signalling in accordance with at least some embodiments of the present invention.

FIG. 4 illustrates signalling in accordance with at least some embodiments of the present invention. On the vertical axes are disposed, on the left, reference data sources R1, R2 and R3, in the centre computing device 120 of FIG. 1 and on the right, a device 110 of FIG. 1. Time advances from the top toward the bottom.

In phase 410, device 110 requests processing of information from computing device 120, wherein an understanding may be agreed concerning a site or geographic location or area, where the information will be processed.

In optional phase 420, device 110 requests from reference data sources R1, R2 and R3 their respective seismic reference data. Where phase 420 is absent, the reference data sources may broadcast or otherwise make available their reference data without specific requests. For example, the reference data may be publicly retrievable from web sites of the reference data sources.

In phase 430, device 110 receives from computing device 120 seismic data, generated by a seismic sensor comprised in computing device 120. In phase 440, device 110 obtains seismic reference data from reference data sources R1, R2 and R3. The obtaining of phase 440 may comprise receiving the data responsive to requests of phase 420, or the obtaining may comprise retrieving without prior requests, where phase 420 is absent.

Phase 450 comprises performing a geographic determination as to, based on the seismic data from computing device 120 and on the reference data from R1, R2 and R3, what is a location of computing device 120.

While three reference data sources are present in FIG. 4, the invention is naturally not limited thereto, rather, the number of reference data sources may be fewer or more than three. In particular, where a reference data source is co-located with computing device 120, one reference data source may suffice and where a geolocation of computing device 120 is attempted to be determined based on the seismic data with no prior assumption of the location, more than three reference data sources may be used. Some phases illustrated in FIG. 4 may be performed in a different order than the one described above, for example phase 420 may take place after phase 430.

Figure 5:
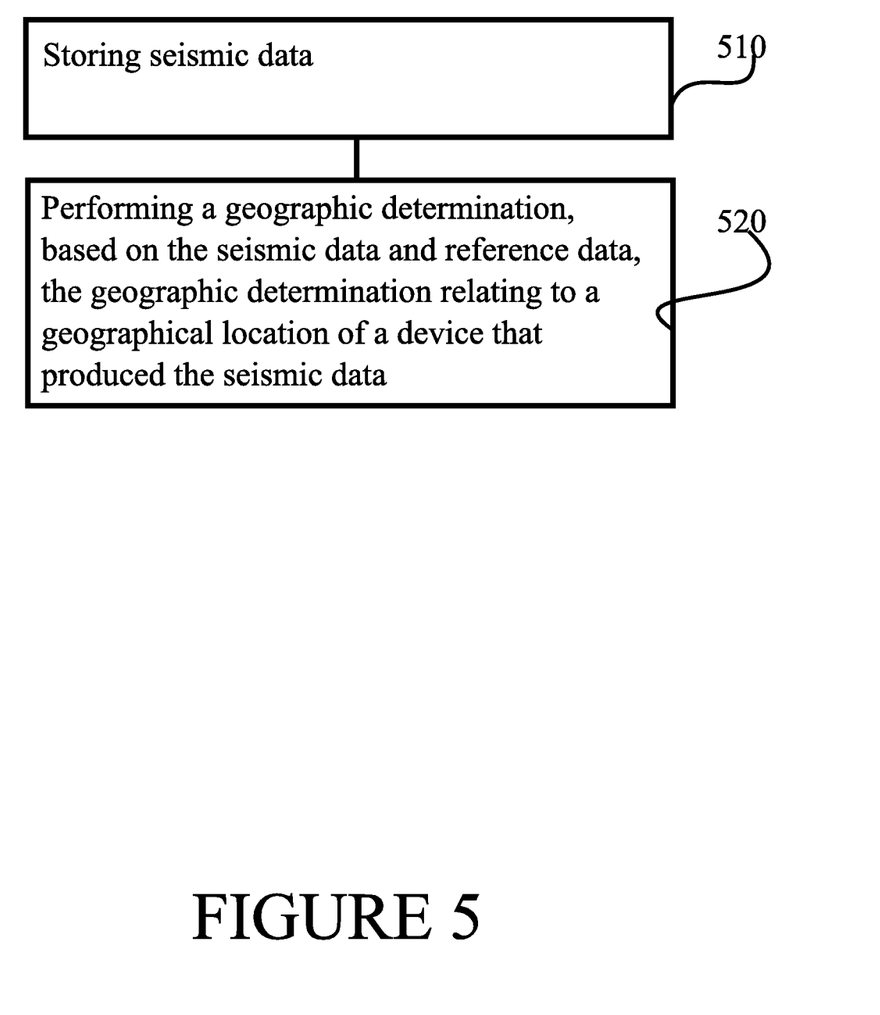
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when implanted therein.

Phase 510 comprises storing seismic data. Phase 520 comprises performing a geographic determination, based on the seismic data and reference data, the geographic determination relating to a geographical location of a device that produced the seismic data.

Figure 6:
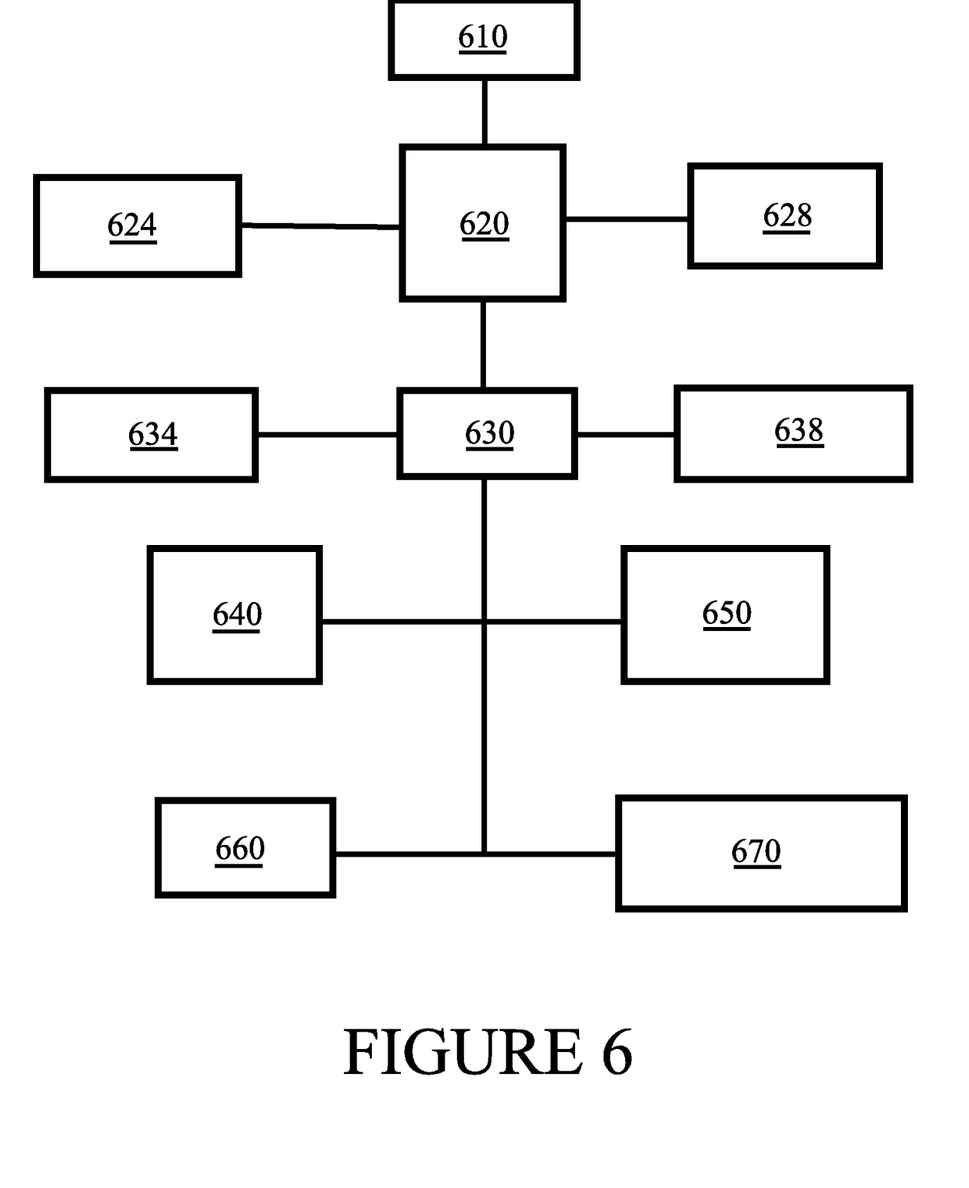
FIG. 6 illustrates an example architecture of computing device 120 of FIG. 1.

FIG. 6 illustrates an example architecture of computing device 120 of FIG. 1. The architecture comprises CPU 610, connected with a north bridge element 620. North bridge element 620 is coupled with AGP slot 624 and memory slots 628.

South bridge element 630 is coupled with north bridge element 620 as well as PCI slots 634 and a display controller 638.

South bridge element 630 is further coupled with UEFI ROM 640, Super I/O 650, TPM element 660 and seismic sensor 670.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing processing security.

ACRONYMS LIST

AGP accelerated graphics port
CPU central processing unit
GPS global positioning system
GLONASS (a satellite positioning system)
HTTP hypertext transfer protocol
HTTPS HTTP over TLS
I2C inter-integrated circuit (computer bus)
LPC low pin count (computer bus)
PCI peripheral component interconnect
ROM read only memory
SPI serial peripheral interface (computer bus)
SSH secure shell
TLS transport layer security
TPM trusted platform module
UEFI unified extensible firmware interface
UICC universal integrated circuit card

REFERENCE SIGNS LIST

110 Device
120 Computing device
125 Data centre
130 Reference data source
140 Network
150 Seismic wave
310-370 Structure of the device of FIG. 3
410-450 Phases of the method of FIG. 4
510-520 Phases of the method of FIG. 5
610-670 Structure of the device of FIG. 6

The invention claimed is:

1. An apparatus for verifying a geographical location of information processing, the apparatus comprising at least one processing core, at least one memory including computer program code, the at least one memory and the computer program code being configured to, with the at least one processing core, cause the apparatus at least to:
   request secure processing of information from a device configured to perform information processing tasks on behalf of the apparatus;
   receive seismic data produced by the device requested to process information in a secure manner;
   receive reference seismic data from one or more known locations;
   perform a geographic determination, based on the seismic data and the reference seismic data, the geographic determination comprising determining whether the seismic data produced by the device requested to process information in the secure manner corresponds to the reference seismic data; and
   verify, based on the geographic determination, the geographical location of information processing.

2. The apparatus according to claim 1, wherein the apparatus comprises the device that produced the seismic data.

3. The apparatus according to claim 1, wherein the device that produced the seismic data is comprised in a cloud computing server.

4. The apparatus according to claim 1, wherein the reference data originates in a second device, the second device being indicated as being co-located with the device that produced the seismic data.

5. The apparatus according to claim 1, wherein the reference seismic data originates in a trusted seismographic source.

6. The apparatus according to claim 5, wherein the geographic determination comprises determining, using seismic wave shape characteristics and/or propagation delays, whether the seismic data is consistent, together with the reference seismic data, with a presumed location of the device that produced the seismic data.

7. The apparatus according to claim 5, wherein the geographic determination comprises deriving, using seismic wave shape characteristics and/or propagation delays and the reference seismic data, an estimate of a geolocation of the device that produced the seismic data.

8. The apparatus according to claim 1, wherein the reference seismic data comprises seismic characteristics of at least one artificial seismic event.

9. The apparatus according to claim 1, wherein the device that produced the seismic data is integrated in a secure computing element on a motherboard of a computer.

10. The apparatus according to claim 1, wherein the at least one processing core is configured to process the seismic data to remove electric motor induced noise from the seismic data before performing the geographic determination.

11. A method for verifying a geographical location of information processing, the method comprising:
    requesting, by an apparatus, secure processing of information from a device configured to perform information processing tasks on behalf of the apparatus;
    receiving seismic data produced by the device requested to process information in a secure manner;
    receiving reference seismic data from one or more known locations;
    performing a geographic determination, based on the seismic data and the reference seismic data, the geographic determination comprising determining whether the seismic data produced by the device requested to process information in the secure manner corresponds to the reference seismic data; and
    verifying, based on the geographic determination, the geographical location of information processing.

12. The method according to claim 11, further comprising producing the seismic data with the device.

13. The method according to claim 11, wherein the device that produced the seismic data is comprised in a cloud computing server.

14. The method according to claim 11, wherein the reference seismic data originates in a second device, the second device being indicated as being co-located with the device that produced the seismic data.

15. The method according to claim 11, wherein the reference seismic data originates in a trusted seismographic source.

16. The method according to claim 11, wherein the reference seismic data comprises seismic characteristics of at least one artificial seismic event.

17. The method according to claim 11, wherein the device that produced the seismic data is integrated in a secure computing element on a motherboard of a computer.

18. A non-transitory computer readable medium having stored thereon a set of computer readable instructions that, when executed by at least one processor, cause an apparatus to at least:
- request secure processing of information from a device configured to perform information processing tasks on behalf of the apparatus;
- receive seismic data produced by the device requested to process information in a secure manner;
- receive reference seismic data from one or more known locations;
- perform a geographic determination, based on the seismic data and the reference seismic data, the geographic determination comprising determining whether the seismic data produced by the device requested to process information in the secure manner corresponds to the reference seismic data; and
- verify, based on the geographic determination, the geographical location of information processing.

* * * * *